United States Patent
Yoshida

(10) Patent No.: US 6,925,511 B2
(45) Date of Patent: Aug. 2, 2005

(54) DISK ARRAY CONTROL APPARATUS AND CONTROL DATA TRANSFER METHOD USING THE SAME

(75) Inventor: Akira Yoshida, Hadano (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/932,405

(22) Filed: Aug. 17, 2001

(65) Prior Publication Data

US 2005/0050268 A1 Mar. 3, 2005

(30) Foreign Application Priority Data

Jul. 4, 2001 (JP) .................................... 2001-202918

(51) Int. Cl.[7] ................. G06F 12/00; G06F 13/14
(52) U.S. Cl. ..................... 710/74; 710/5; 711/114
(58) Field of Search .................... 710/5, 36, 39, 710/52, 62, 74; 711/112–114, 147

(56) References Cited

U.S. PATENT DOCUMENTS

| 5,636,359 | A | * | 6/1997 | Beardsley et al. | .......... 711/122 |
| 5,680,640 | A | | 10/1997 | Ofek et al. | |
| 5,937,174 | A | * | 8/1999 | Weber | .......... 710/71 |
| 6,601,138 | B2 | * | 7/2003 | Otterness et al. | .......... 711/114 |

FOREIGN PATENT DOCUMENTS

JP  2000-99272  4/2000

* cited by examiner

*Primary Examiner*—Kim Huynh
(74) *Attorney, Agent, or Firm*—Townsend and Townsend and Crew LLP

(57) ABSTRACT

A disk array control apparatus includes a plurality of disk array control units for controlling data transfer between a plurality of host computers and a plurality of magnetic disk devices via a channel interface and a disk interface. The apparatus also includes an interconnection network for connection between shared memory portions in the plurality of disk array control units and an interconnection network for connection between cache memories in the disk array control units so as to transfer control information concerning data transfer between the host computers and cache memories and management information of the magnetic disk devices from one of the disk array control units to another of disk array control units. This enables to execute data processing while data transfer is performed from one of the disk array control units to another thereof.

12 Claims, 7 Drawing Sheets

DISK ARRAY CONTROL APPARATUS AND CONTROL DATA TRANSFER METHOD USING THE SAME

BACKGROUND OF THE INVENTION

1. Field of the Invention

The present invention relates to a disk array control apparatus and in particular, to a disk array control technique for a disk array storing data in a plurality of magnetic disk devices. Moreover, the present invention relates to a disk array control apparatus connected to a plurality of servers and personal computers.

2. Description of the Related Art

A great expectation has been raised on a computer system to improve processing performance such as data input and output (hereinafter, referred to as I/O) performance of a disk sub-system. The I/O performance of disk sub system using a magnetic disk as a storage medium (hereinafter, simply referred to as "sub-system") is smaller than that of a computer main storage using a semiconductor storage device to the extent of 3 to 4 digits. Efforts have been made to reduce this difference, i.e., to improve the I/O performance of the sub-system.

Moreover, in large enterprises such as banks, stock companies and telephone companies, computers and storage devices which have conventionally been dispersed in various places now tend to be concentrated in a data center so as to constitute a computer system and a storage system, thereby reducing costs required for operation, maintenance, and management of the computer system and storage system. Especially, a large-size/high-end storage system is required to have channel interface support (connectivity) for connecting to several hundreds or more of host computers and storage capacity support for several tera-bytes or more.

On the other hand, with recent enlargement of the open market and spread of the storage area networks (SAN) in future, a small-size (small-size frame) storage system having a high performance and high reliability to be compared to the large-size/high-end storage system is now required extensively.

As one of the methods to improve the sub-system I/O performance, a so-called disk array system is known in which a plurality of magnetic disk devices are used to constitute a sub-system so that data is stored in a plurality of magnetic disk devices. The disk array normally includes a plurality of magnetic disk devices for recording an I/O request from an upper computer and a disk array controller for receiving the I/O from the upper computer and transferring it to the plurality of magnetic disk devices. For the request for a large-size connection and a large capacity, a method is considered to connect a plurality of conventional large-size/high-end disk array controllers to constitute an ultra-large-size disk array controller. It is known that such a disk array controller retains a shared memory for storing control information concerning the disk array controller (such as management information of a cache memory in the disk array controller).

With the connections of a plurality of disk array controllers, the cache memory and the shared memory are dispersed over the plurality of disk array controllers. It is advantageous that the cache memory stores data of magnetic disk devices connected to its storage controller if performance is taken into consideration. Similarly, the shared memory is advantageously mounted on the same storage controller for the management information (such as a logical volume) for the magnetic disk devices connected to the cache memory and its storage controller if the performance is considered.

Moreover, with fault and expansion of magnetic disk devices and storage controllers, the configuration may be modified since the aforementioned configuration is advantageous in the performance of operating between the cache memory and the magnetic disk controllers. In the case of viewpoint from the upper computer and software, it is advantageous in that a single disk array controller can be managed with use of continuing the current architecture regardless of the ultra-large-size disk array controller connected with a plurality of disk array control units. Moreover, the shared memory is also advantageously managed as a single logical space not requiring a complicated control. Thus, by considering physical dispersion of the shared memory into the plurality of disk array controllers, it is necessary to consider optimal connection relationship of the cache memory and the magnetic disk devices and the shared memory mounting position upon reconstruction caused by an additional device. The transfer performance caused by copying a shared memory domain affects the disk array system more greatly as compared to the conventional system including a single disk array controller.

For example, as shown in FIG. 2, a system includes a plurality of channel IF (Interface) 11 executing data transfer between a host computer 50 and a disk array controller 2; a plurality of disk IF 12 executing data transfer between magnetic disk devices 5 and the disk array controller 2; a cache memory 14 for temporarily storing data of the magnetic disk devices 5; and a shared memory portion 13 for storing control information concerning the disk array controller 2 (such as information concerning data transfer control between the channel IF 11 and the cache memory 14, and between the disk IF 12 and the cache memory 14). In the one disk array controller 2, the shared memory portion 13 and the cache memory 14 have configuration enabling to be accessed from all the channel IF 11 and the disk IF 12. In this disk array controller 2, the channel IF 11 and the disk IF 12 are connected to the shared memory portion 13 by an interconnection network 21, while the channel IF 11 and the disk IF 12 are connected to the cache memory by an interconnection network 22.

The channel IF 11 has interface for connection to the host computer 50 and a microprocessor (not depicted) controlling input/output to/from the host computer 50. Moreover, the disk IF 12 has interface for connection to the magnetic disk devices 5 and a microprocessor (not depicted) controlling input/output to/from the magnetic disk devices 5. Moreover, the disk IF 12 also executes the RAID function.

In this disk array controller 2, since the shared memory portion 13 is present within the disk array controller, there is no need of having information shared between the shared memories. Even when copying is requiring between shared memories, this affects little other access such as interconnection network concurrence caused by transfer because the shared memories are arranged in a single unit.

Moreover, U.S. Pat. No. 5,680,640 discloses a data transfer function in which data transfer from an old storage device to a new storage device is performed by on-line. Here, the new storage device has a table for each address (track) of volumes in the old storage device and completion of data transfer from the old storage device to the new storage device is stored for each of the tracks. When an I/O is requested from a host during transfer, the corresponding table is referenced to determine the operation. For example, when a read request is made, the corresponding table is referenced to check whether the record (block) requested to be read has been transferred to the new storage device and if data transfer from the old storage device has not been performed, data is read from the old storage device. If the new storage device has data, the data is read out from the new storage device. Moreover, when a write request is made, data is written into the new storage device to update the table. This method shows the transfer function when replacing the storage device, but this method can be applied to a system constituted by a plurality of disk array controllers.

Moreover, JP-A-2000-99272 discloses a technique for connecting an upper node device having a central processing unit with a storage controller and a disk drive unit using a fiber channel network and adding during on-line a new storage controller to the system configuration of the upper node device having a management tool for controlling this fiber channel network, thereby transferring control information from the existing storage controller.

According to the technique disclosed in U.S. Pat. No. 5,680,640, each of the tracks in the storage device as a transfer source should have a table. Normally, a semiconductor memory is used for the table, and when both of the transfer source and the transfer destination have tables, the cost is increased. Moreover, in this method, upon write from a host during data transfer, data is written only to a transfer destination. Accordingly, if an error occurs in either of the storage device during transfer, a data contradiction is caused in both of the storage devices. Moreover, this technique is for data transfer when replacing a storage device and does not describe data transfer between a plurality of disk array controllers in operation.

Moreover, according to the technique disclosed in JP-A-2000-99272, during a take over of a logical unit as control information, if a processing request is made to this logical unit from an upper node device to a storage controller of take-over source, the storage controller of the take-over source returns a busy status until the take-over is completed. When a busy status is repeatedly returned in response to a command processing request from the upper node device, there is a danger that the command processing request from the upper node device may cause time out and accordingly, the logical unit take-over should be processed within a range not causing the time out. Since the range not causing the time out fluctuates due to a large logical unit information amount to be taken over and due to various conditions such as a fiber channel network load, it is considered to be very difficult for the management tool managing the fiber channel network to determine a take-over method to minimize the performance deterioration. Moreover, when the logical unit to be taken over is divided into several times, the processing time required for the logical unit take-over becomes very large, which inevitably causes performance deterioration in the upper node device, too.

SUMMARY OF THE INVENTION

It is therefore an object of the present invention to provide a disk array control apparatus and control data transfer method of using the same capable of restraining performance decrement caused by data transfer between the shared memories dispersedly arranged on a plurality of disk array control apparatuses and of providing a performance proportional to the number of disk array control apparatuses.

In order to achieve the aforementioned object, the disk array control apparatus according to the present invention has configuration as follows.

The disk array control apparatus includes a plurality of disk array control units, each having: a channel interface interfacing with a host computer; a disk interface interfacing with a magnetic disk device; a cache memory for temporarily storing data to be read/written from/to the magnetic disk device; a shared memory portion for storing control information concerning data transfer between the channel interface and the cache memory and between the disk interface and the cache memory and management information of the magnetic disk device; connection portion for connecting the channel interface and the disk interface to the cache memory; and connection portion for connecting the channel interface and the disk interface to the shared memory portion; wherein for data read/write request from the host computer, the channel interface performs data transfer between the interface with the host computer and the cache memory while the disk interface performs data transfer between the magnetic disk device and the cache memory, thereby performing data read/write, and wherein connection network is provided for connection between the shared memory portions in the plurality of disk array control units and connection network is provided for connection between the cache memories in the plurality of disk array control units. The connection network connecting the shared memory portions and the connection network connecting the cache memories operate independently from each other. In the channel interface and the disk interface of one of the disk array control units, it is possible to read/write data from/to the shared memory portion or the cache memory in another of disk array control units. This enables transfer processing requiring data transfer between the shared memory portion in one of the disk array control units and the shared memory portion in another of the disk array control units.

Preferably, the plurality of channel interfaces and the plurality of disk interfaces are connected to the plurality of cache memories by an interconnection network using a switch capable of being switched to the plurality of disk array control units; and the plurality of channel interfaces and the plurality of disk interfaces are connected to the plurality of shared memory portions by an interconnection network using a switch capable of being switched to the plurality of disk array control units.

When transferring control information (such as a logic volume as an internal management unit) of the shared memory portion to another shared memory portion in another of the disk array control units, data is transferred via an interconnection network using a switch capable of switching to the plurality of disk array control units. Prior to transfer, a transfer start address, a transfer end address, and a transfer start information are loaded in the transfer control unit of the switch block connected to both of the transfer destination shared memory portion and the shared memory of the transfer source. When the transfer start information is loaded, a micro-program of the transfer source recognizes that the transfer is complete and can switch to another processing. After loading of the transfer start information is completed, upon generation of a read access request to the transfer destination shared memory, hardware makes a comparison with the access address by the control unit to determine whether the address is a transfer-not-completed domain. If the access is to a transfer-not-completed domain, access is switched to the transfer source shared memory, the data is read out from the transfer source shared memory, and the data is transmitted to the source which has issued the request. Moreover, if an access request is made to a transfer-completed domain, data is read out from a transfer destination shared memory and the data is transmitted to the source which has issued the request. A micro-program of the source which issues a request need not consider that the area is being transferred.

DETAILED DESCRIPTION OF THE EMBODIMENTS

Description will now be directed to embodiments of the present invention with reference to the attached drawings.

Embodiment 1

Figure 1:
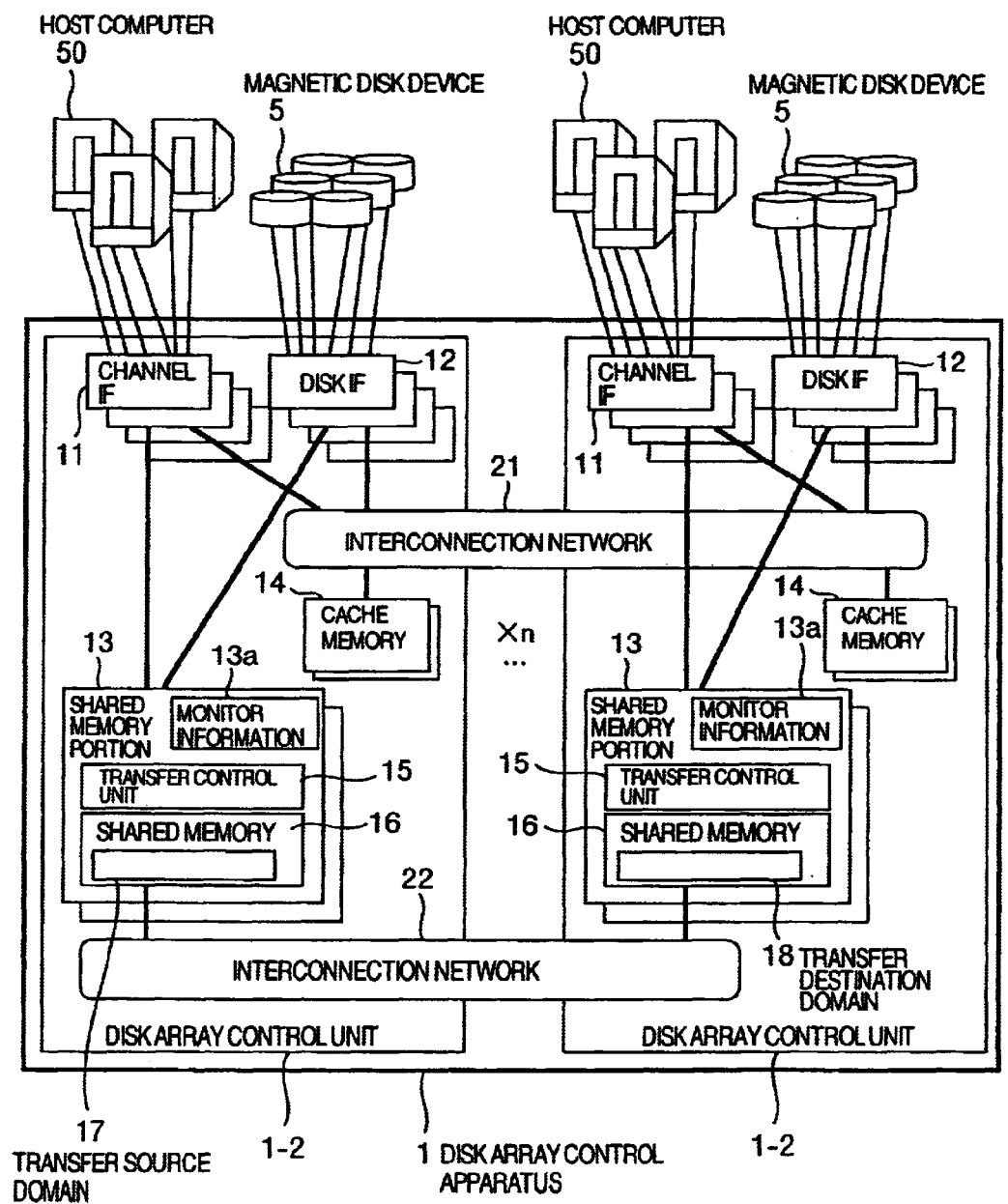
FIG. 1 shows configuration of a disk array control apparatus according to an embodiment of the present invention.
Figure 2:
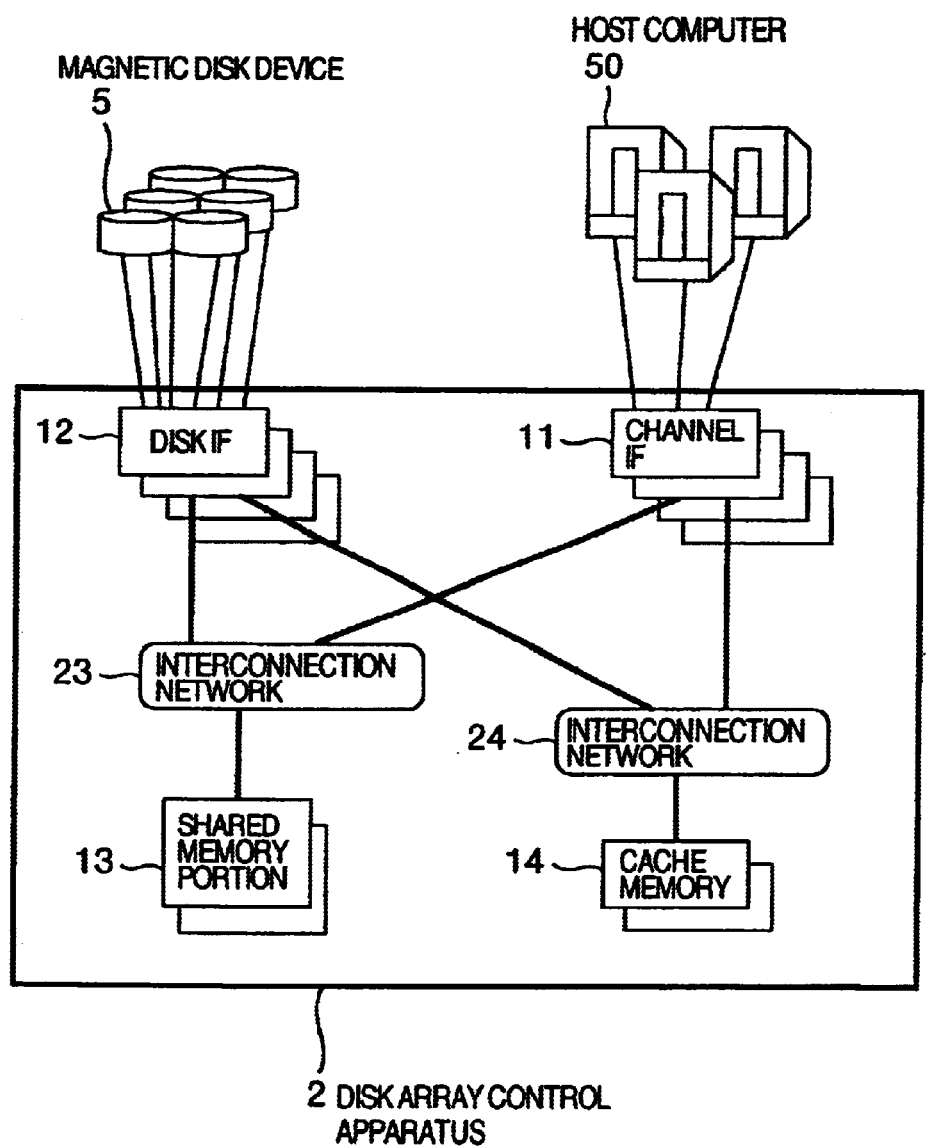
FIG. 2 shows configuration of a conventional disk array control apparatus.
Figure 3:
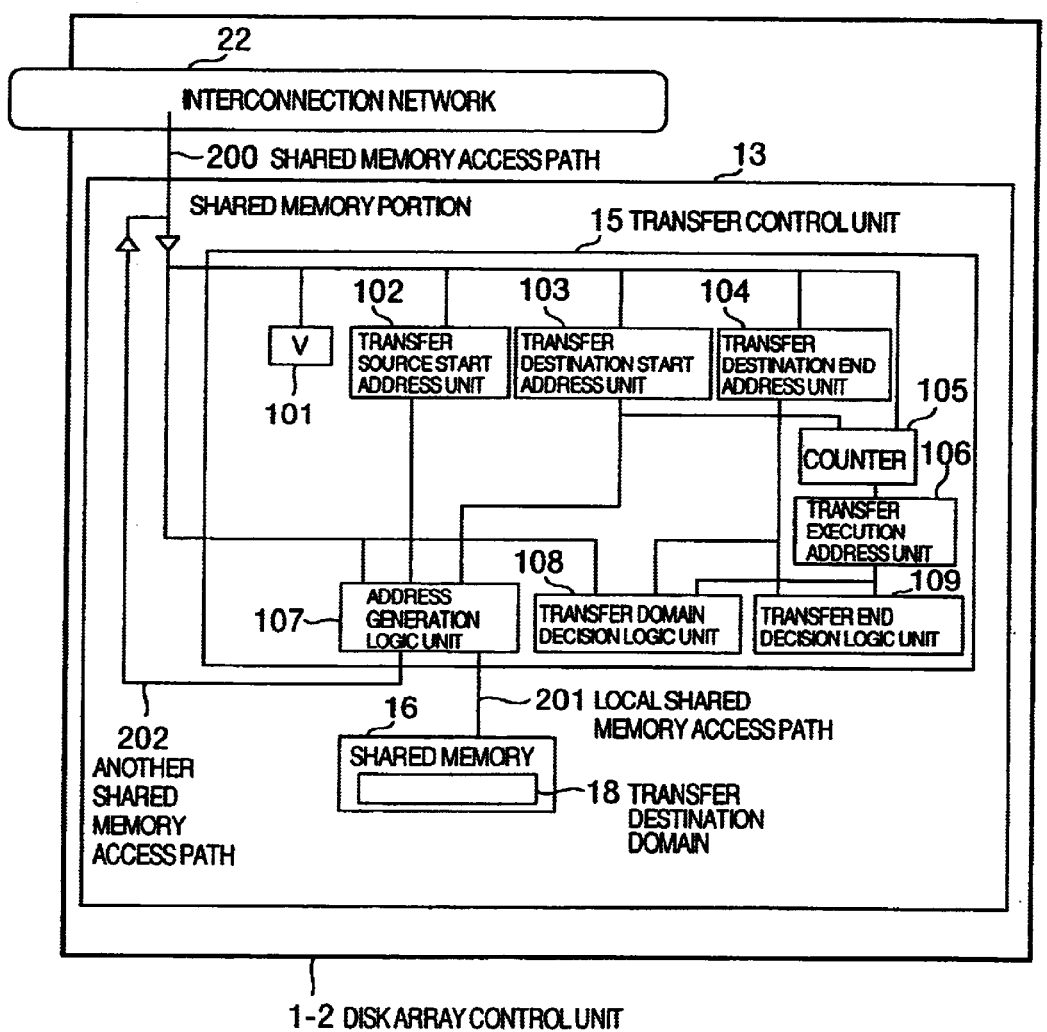
FIG. 3 shows detailed configuration of a disk array control unit shown in FIG. 1.

FIG. 1 and FIG. 3 shows a first embodiment of the present invention.

As shown in FIG. 1, a disk array control apparatus 1 includes a plurality of disk array control units 1–2. Each of the disk array units 1–2 has an interface (channel IF) with a host computer 50, an interface (disk IF) with a magnetic disk device 5, a shared memory portion 13, and a cache memory 14. The channel IFs 11 and the disk IFs 12 are directly connected to the shared memory portions 13 in the disk array control units 1–2. Moreover, between the plurality of disk array control units 1–2, the shared memory portion 13 are connected to each other via an interconnection network 22 and the cache memories 14 are connected to each other via an interconnection network 21. That is, via the interconnection network 21 or the interconnection network 22, it is possible to access all the shared memory portions 13 or all the cache memory 14 from all the channel IFs 11 and the disk IFs 12. Since the interconnection network 21 connecting the cache memory 14 and the interconnection network 22 connecting the shared memory portions 13 can operate independently from each other, it is possible to simultaneously execute cache memory data transfer and shared memory data transfer. Each of the shared memory portions 13 has a transfer control unit 15 for storing transfer start information and transfer I formation and a shared memory 16. The shared memory portion 13 also has a monitor information portion 13a for monitoring a frequency in use of the interconnection network 22.

In FIG. 1, when a shared memory data transfer is performed between the disk array control units 1–2, the shared memory data transfer is started by a micro-program in the channel IF 11 and accordingly, the channel IF 11 sets a transfer source shared memory address, a transfer destination shared memory address, and a valid bit indicating the transfer start in the transfer control unit 15 in the shared memory portion 13 where the transfer source shared memory domain 17 is present. Similarly, the transfer information is also set in the transfer control unit 15 in the shared memory portion 13 in the other disk array control unit 1–2. Completion of the transfer information loading to the transfer control unit 15 is reported from the transfer destination shared memory portion 13 to the micro-program of the channel IF which has made the transfer request. Then, the micro-program can know the transfer completion and switch to another processing. When the shared memory portion 13 having the transfer source shared memory domain 17 recognizes that the transfer execution bit of the transfer control unit has become valid, the shared memory portion 13 reads out a value of the transfer source domain 17 in the shared memory 16 and transfers it to the shared memory portion 13 in the other disk array control unit 1–2. When the transfer data arrives, the shared memory portion 13 in the other disk array control unit 1–2 having a transfer destination domain 18 writes the transfer data to the transfer destination domain 18. Similar process is performed for all the transfer-not-completed domains and upon completion of data transfer in all the domains, validity of the transfer execution bit in the transfer control unit 15 in each of the shared memory portions 13 is turned off. When the transfer execution bit in the transfer control unit 15 indicating that transfer is in progress is valid, if an access is made other than the access requiring the transfer process to the transfer destination domain 18 in the transfer destination shared memory portion 13, and if the access request is to the shared memory 16 in the transfer destination shared memory portion 13, an address comparison is performed with the transfer-not-completed domain address in the transfer control unit 15. If the access domain is in the transfer-not-completed domain and if the access is a read-out request, the request is transferred to the shared memory portion 13 by hardware and data is read out from the transfer source domain 17, thereby performing data transfer to the access request source. If the access is a write-in access, then write is performed to a corresponding address portion of the transfer destination domain 18 and to a corresponding address portion of the transfer source domain 17. If the access domain is other than the transfer end domain and a domain for transfer, then read-out and write-in operations are performed to that domain of the shared memory 16.

Referring to FIG. 3, explanation will be given on process in the shared memory portion 13 during transfer between shared memory portions of the two disk array control units 1–2. For starting the transfer process of the shared memory portions by a micro-program, via the interconnection network 22 interconnecting the disk array control units 1–2, transfer information is set in the transfer source start address unit 102, the transfer destination start address unit 103, and the transfer destination end address unit 104 in the transfer control unit 15 of the shared memory portion 13 having the transfer destination domain 13. Furthermore, a valid bit indicating the transfer start is set in the transfer execution bit unit 101 in the transfer control unit 15 in the shared memory portion 13 having the transfer destination domain 18. When the valid bit is set in the transfer execution bit unit 101, an address generation logic unit 107, a transfer domain decision logic unit 108, and a transfer end decision logic unit 109 can start their functions. When completion of transfer information loading to the transfer control unit 15 is reported from the shared memory portion 13 to the micro-program of the transfer request source channel IF, the micro-program can switch to another processing.

It is also possible to switch to another processing after waiting for completion of writing into the entire transfernot-completed domain of the shared memory 16. For a transfer request requiring transfer processing, the shared memory portion 13 writes transfer information into the transfer destination domain 18 in the shared memory. Upon acceptance of a transfer request requiring transfer processing, a counter 105 in the transfer control unit 15 is updated and addition with the transfer destination start address unit 103 is performed, thereby setting the current transfer execution address in the transfer execution address unit 106. Each time a transfer request is accepted, the counter 105 is incremented and the transfer execution address unit 106 is updated. A value of the transfer destination end address unit 104 is compared to a value of the transfer execution address unit 106 by the transfer end decision logic unit 109, thereby deciding whether the transfer is completed. When the transfer end is decided, the transfer execution bit unit 101 is reset, thereby terminating the transfer processing. The shared memory portion also has an identical transfer end decision logic and there is no need of reporting the transfer end to the shared memory portion. Of course, it is also possible to employ a method for reporting a transfer end to the transfer source shared memory portion and the micro-program.

Next, explanation will be given on a process for a request to the shared memory 16 other than the transfer process during a transfer process. It is advantageous for performance when a request other than the transfer process to the shared memory 16 has a priority in the shared memory portion 13. When the request to the shared memory 16 other than transfer process is accepted, the shared memory portion 13 decides that transfer is in progress if the transfer execution bit unit 101 is set in the transfer control unit 15, and according to the transfer domain decision logic unit 108, a value of the transfer execution address unit 106 is compared to a value of the transfer destination address unit 104 and a request address value, thereby deciding whether the request address is for access to the transfer-not-completed domain. If the transfer domain decision logic unit 108 decides that the request address is an access to the transfer-not-completed domain, then the address generation logic unit 107 determines an access address to the transfer source shared memory according to a difference between the value of the transfer source start address unit 102 and the transfer destination start address unit 103 and according to the addition with the request address, and transfers the request to the transfer source shared memory portion via the interconnection network 22 using an access path 202. In case of a write request, even if write to the transfer-not-completed domain, the method to write also to a corresponding address of the local shared memory 16 is advantageous for failure and performance. In case of write to a transfer-not-completed domain, when updated information is present in the shared memory portion 13, request to this domain afterward can be accepted as requests to the local shared memory 16, which eliminates necessity to transfer the requests to the transfer source shared memory portion in the other disk array control unit containing the transfer source domain. When the transfer domain decision logic unit 108 decides that a request address is to access to a domain other than the transfer end domain and the domain for transfer, the address generation logic unit 107 selects the request address and makes an access to the local shared memory 16 via the local shared memory access path 201. Each of the units incorporated in the transfer control unit 15 shown in FIG. 3 may be a hardware structure constituted of flip-flops, registers and the like, and may also be a software structure constituted of computer programs. The transfer control unit 15 shown in FIG. 4 may also be similar to either the software or hardware structure.

Embodiment 2

Figure 4:
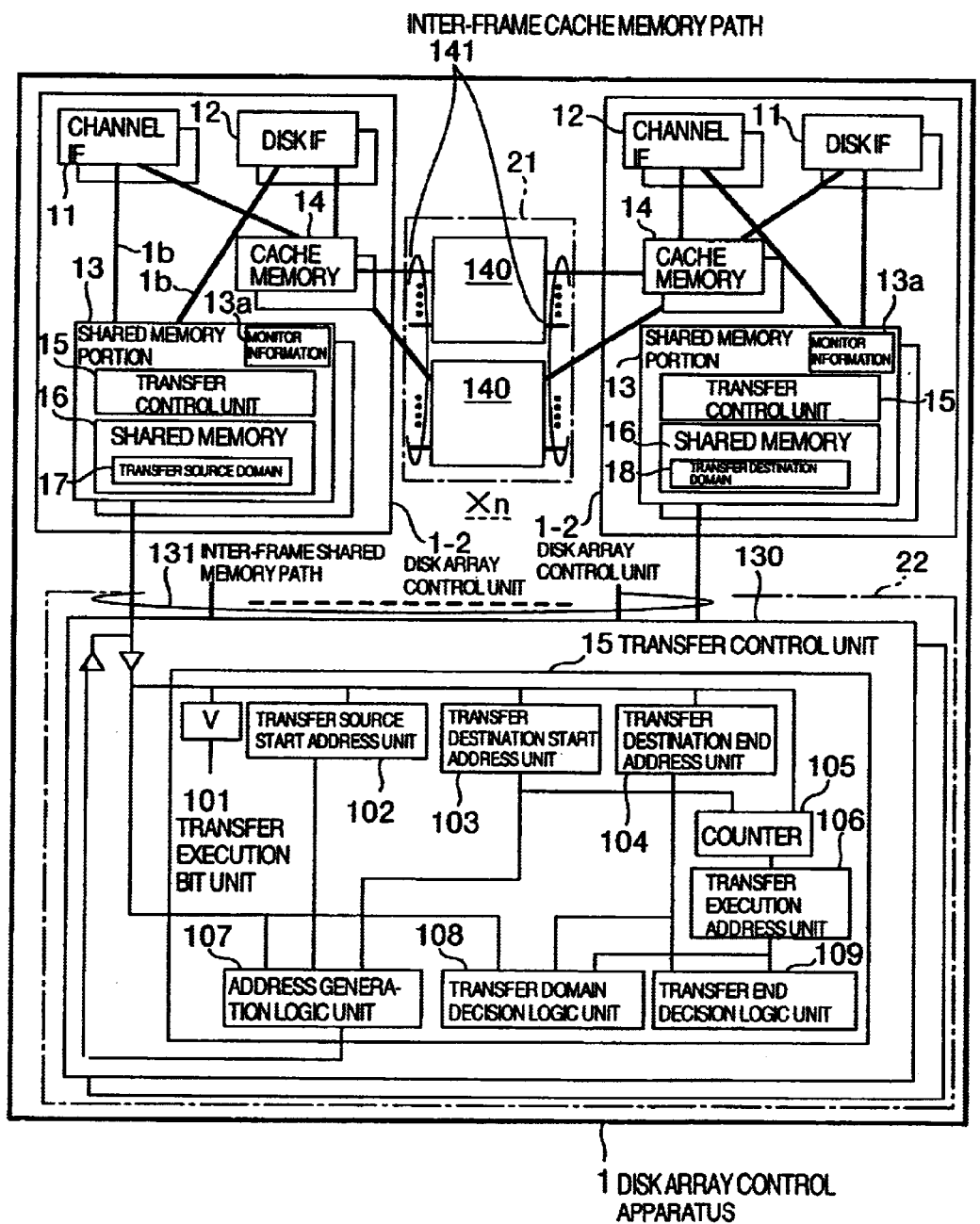
FIG. 4 shows configuration of the disk array control apparatus according to a second embodiment of the present invention.

FIG. 4 shows a second embodiment of the present invention.

As shown in FIG. 4, the disk array control apparatus 1 including a plurality of disk array control units 1–2 according to the second embodiment has an identical configuration as the disk array control apparatus 1 of the first embodiment except for the connection configuration between the channel IFs 11 and 12 and the cache memory 14 and the connection configuration between the shared memory portions 13.

As shown in FIG. 4, the cache memory 14 in the disk array control unit 1–2 is connected to the other cache memory 14 in the other disk array control unit 1–2 via an inter-frame cache switch 140 for switching a plurality of cache memories 14. The inter-frame cache switch 140 has dual structure having redundancy considering failure. That is, two of cache switches 140 are provided. Moreover, the inter-frame cache memory path 141 also has dual structure. Via the inter-frame cache memory path 141 and the inter-frame cache memory switch 140, it is possible to access the cache memories 14 of different disk array control units 1–2.

Generally, data transfer of a path accessing a cache and disk is of large-size because transfer of several kilo bytes may occur while data transfer of a path accessing a shared memory is in the order of several bytes for several cycles because the data is control information. When a single interconnection network is used, the path accessing the shared memory and the path accessing the cache and disk use the same interconnection network. This lowers the performance of the shared memory access which is a small-size access. For this reason, as shown in FIG. 4, the shared memory portion 13 in the disk array control unit 1–2 is connected to the other shared memory portion 13 of the other disk array control unit 1–2 via an inter-frame shared memory switch 130 which is separately arranged from an inter-frame cache memory switch 140, using an inter-frame shared memory path 131. For coping with an error, the inter-frame shared memory switch 130 has dual structure having redundancy. Similarly, the inter-frame shared memory path 131 also has dual structure. The inter-frame cache memory switch 140 and the inter-frame cache memory path 141 can operate independently from the inter-frame shared memory switch 130 and the inter-frame shared memory path 131.

The shared memory portion 13 has a transfer control unit 15 having identical configuration as the transfer control unit 15 shown in FIG. 3. Moreover, as shown in FIG. 4, the inter-frame shared memory switch 130 also has structure having a transfer control unit 15 as the interconnection network 22.

Referring to FIG. 4, explanation will be given on processing in the inter-frame shared memory switch 130 during transfer processing in the shared memory domain of the two disk array control units 1–2. For starting a transfer process of the shared memory domain by a micro-program, via the inter-frame shared memory path 131 and the inter-frame shared memory switch 130 between the two disk array control units 1–2, transfer information is set in the transfer source start address unit 102, transfer destination start address unit 103, and transfer destination end address unit 104 arranged in the transfer control unit 15 of the shared memory portion 13 having the transfer destination shared memory domain 18. Furthermore, a valid bit indicating the transfer start is set in the transfer execution bit unit 101 in the transfer control unit 15 of the shared memory portion 13 having the transfer destination shared memory domain 18. Similarly, transfer information is set in the transfer source start address unit 102, transfer destination start address unit 103, and transfer end address unit 104 in the transfer control unit 15 in the inter-frame shared memory switch 130. Furthermore, a valid bit indicating the transfer start is set in the transfer execution bit unit 101 in the transfer control unit 15 in the inter-frame shared memory switch 130.

When the transfer execution bit unit 101 is set, an address generation logic unit 107, transfer domain decision logic unit 108, and transfer end decision logic unit 109 in the transfer control unit 15 can function. Completion of transfer information loading into the transfer control unit 15 in the shared memory portion 13 having the transfer destination domain 18 and into the transfer control unit 15 in the inter-frame memory switch 130 is reported from the shared memory portion 13 having the transfer destination domain 18 and the inter-frame shared memory switch 130 to a micro-program of the transfer request source channel IF. Thus, the micro-program can recognize completion of the transfer processing and switch to another process.

Of course, it is also possible to employ a method to switch to another process after waiting for completion of write to the entire transfer-not-completed domain in the shared memory 16. For a transfer request requiring transfer processing, the shared memory portion 13, if the transfer execution bit is set, writes transfer information into the transfer destination domain 18 in the shared memory.

The inter-frame shared memory switch 140, upon acceptance the transfer request requiring transfer processing, updates the counter 105 in the transfer control unit 15 and performs addition with the transfer destination start address unit 103, thereby setting the current transfer execution address in the transfer execution address unit 106. Each time a transfer request is accepted, the counter 105 is incremented and the transfer execution address unit 106 is updated. A value of the transfer destination end address unit 104 is compared to a value of the transfer execution address unit 106 by the transfer end decision logic unit 109 so as to determine whether the transfer is completed. If it is determined that the transfer is completed, the transfer execution bit unit 101 is reset and the transfer processing is terminated.

When the transfer source shared memory portion also has the similar transfer end decision logic, there is no need to report the transfer end to the transfer source shared memory portion. It is also possible to employ a method that the transfer end is reported from the inter-frame shared memory switch 130 and the shared memory portion 13 to the transfer source shared memory portion and the micro-program.

Next, explanation will be given on processing in response to a request other than transfer processing to the shared memory 16 during transfer processing. It is advantageous for performance that the request other than transfer processing to the shared memory 16 has priority in the inter-frame shared memory switch 130. When the request other than transfer processing to the shared memory 16 is accepted, the inter-frame shared memory switch 130 determines that transfer in progress if the transfer execution bit unit 101 in the transfer control unit 15 is set and, using the transfer domain decision logic unit 108 to compares values of the transfer execution address unit 106 and the transfer destination end address unit 104 with a value of the request address so as to determine whether the request address is in the transfer-not-completed domain. If the transfer domain decision logic unit 108 determines that the request address is in the transfer-not-completed domain, then the address generation logic unit 107 determines a difference between the value of the transfer source start address unit 102 and the transfer destination start address unit 103 and performs addition with the request address, thereby obtaining the access address to the transfer source shared memory and transfers the request to the transfer source shared memory portion 13 using the inter-frame shared memory path 131.

Moreover, if the transfer domain decision logic unit 108 determines that the request address is other than the transfer end domain and the transfer for transfer, then the address generation logic unit 107 selects the request address and makes an access to the shared memory portion 13 in the disk array control unit 1–2 having the shared memory domain, using the inter-frame shared memory path 131. In the case the inter-frame shared memory switch 130 does not have the transfer control unit 15, upon generation of a request other than transfer processing to the transfer destination domain 18, access is made from the access source disk array control unit 1–2 to the shared memory portion 13 in the other disk array control unit 1–2 having the transfer destination domain 18 via the inter-frame shared memory path 131 and the inter-frame shared memory switch 130. After this decision is made that the domain is non-transfer-not-completed domain, and access should be made to the shared memory portion 13 in the other disk array control unit 1–2 having transfer source domain 17 via the inter-frame shared memory path 131 and the inter-frame shared memory switch 130. In contrast to this, when the inter-frame shared memory switch 130 has the transfer control unit 15, it is possible to decide whether the access domain is a non-transfer-not-completed domain without accessing the shared memory portion 13 in the other disk array control unit 1–2 containing the transfer destination domain 18. This increases the processing speed and reduce the time occupying the inter-frame shared memory path 131. That is, this method is advantageous for performance.

According to this embodiment, where transfer processing is performed between two shared memory portions, a micro-program of the transfer execution source can complete the transfer processing by loading transfer information in the transfer control unit 15 and can switch to another processing. After the transfer information is loaded in the transfer control unit 15, all the shared memories can be accessed without consciously considering that the transfer is in progress. In case of access to a domain for transfer, the micro-program need not consider the address modification or request dispatching. Moreover, by implementing a logic that a normal processing has priority to transfer processing operation, it is possible to reduce the affect of the transfer processing to the performance of the other processing. Moreover, by providing the cache access inter-frame connection network separately from the shared memory inter-frame connection network, transfer processing between the shared memory portions need not affect cache access.

Embodiment 3

Figure 5:
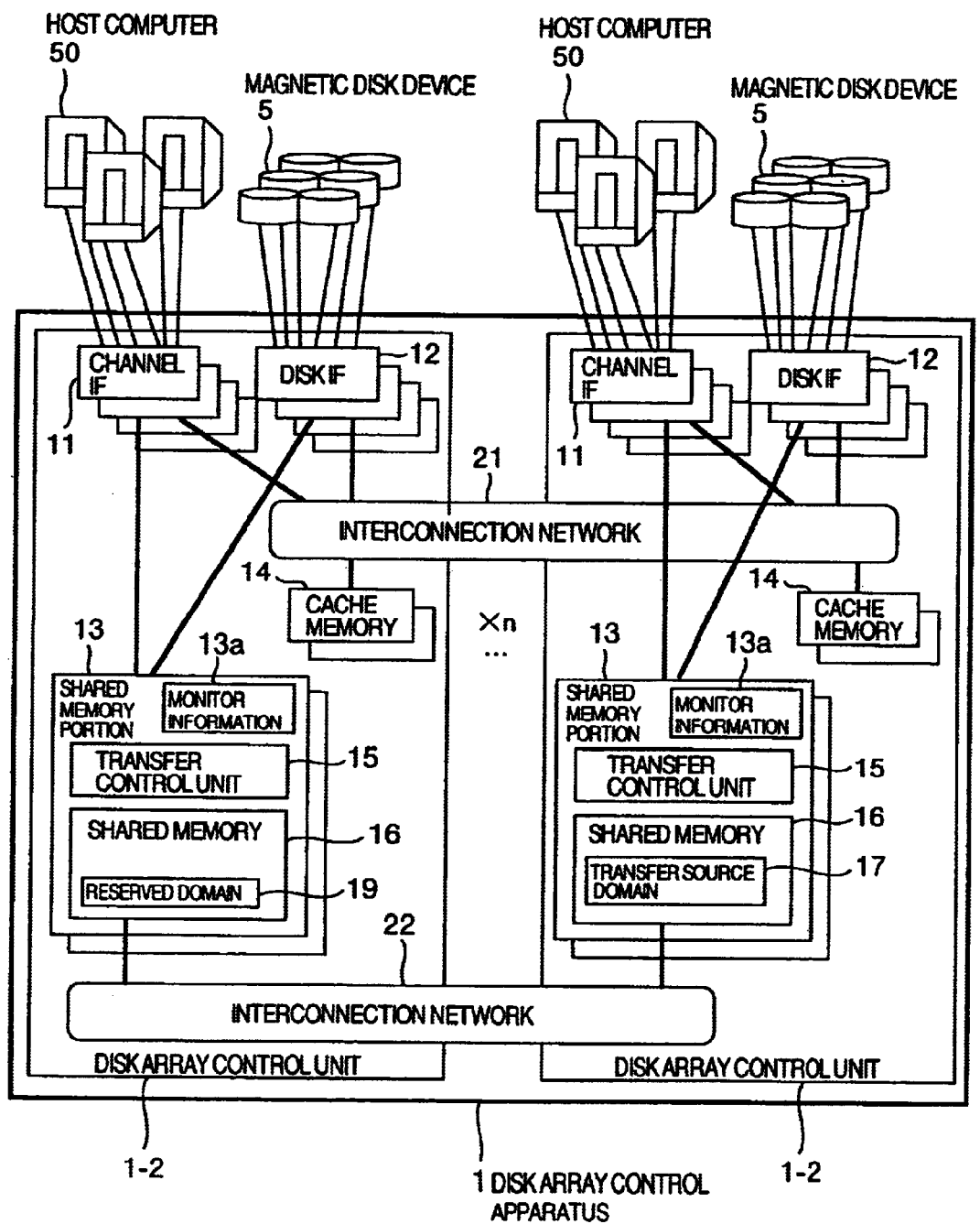
FIG. 5 shows configuration of the disk array control apparatus according to a third embodiment of the present invention.

FIG. 5 shows a third embodiment of the present invention.

As shown in FIG. 5, the third embodiment has configuration identical to the first embodiment shown in FIG. 1 except for the configuration inside the shared memory 16 of the shared memory portion 13. As shown in FIG. 5, a reserved domain 19 is provided in the shared memory 16 in the shared memory portion 13 of each of the disk array control units 1–2, thereby enabling to reconstruct and rearrange the shared memory 16 between the disk array control units 1–2. For the shared memory portion 13 storing control information concerning data transfer between the channel IFs 11 and 12 and the cache memory 14 and management information of the magnetic disk device 5, it is advantageous in performance to hold information in the local disk array control unit 1–2. When the shared memory portion 13 is dispersed in a plurality of disk array control units 1–2, it is difficult for the shared memory portion 13 of a local disk array control unit 1–2 to hold information in the local disk array control unit.

Referring to FIG. 5, explanation will be given on rearrangement (relocation) of the shared memory during operation. When a monitoring mechanism (not depicted) detects that information of a local disk array control unit 1–2 is stored in the shared memory portion 13 of the other disk array control unit 1–2, a micro-program sets the transfer source shared memory address and the reserved domain address and a valid bit indicating the transfer start in the transfer control unit 15 in the shared memory portion 13 of the other disk array control unit 1–2 storing the information of the local disk array control unit. Similarly, the microprogram sets the transfer source shared memory address and the reserved domain address and a valid bit indicating the transfer start in the transfer control unit 15 of the shared memory portion 13 of the local disk array control unit 1–2. When completion of the transfer information loading in the transfer control unit 15 is reported from the transfer source shared memory portion 13 to the micro-program of the channel IF of the relocation request source, the micro-program can recognize the completion of the relocation processing and can switch to another processing. When the transfer execution bit in the transfer control unit becomes valid, the shared memory portion 13 having the transfer source domain 17 reads out the value of the transfer source domain 17 from the shared memory 16 and transfers the value via the interconnection network 22 to the shared memory portion 13 of the relocation request source in the other disk array control unit 1–2. Upon arrival of the transfer data, the shared memory portion 13 of the relocation request source writes the transfer data into the reserved domain 19.

Similar processing is performed for all the transfer-not-completed domains. Upon completion of the all the domain transfer, the transfer execution bit in the transfer control unit 15 in each of the shared memory portions 13 is turned off from the valid state.

In case the transfer execution bit unit 101 in the transfer control unit 15 indicating that transfer is in progress is valid, if an access is made other than the access for transfer processing to the transfer source domain 17 in the transfer source shared memory portion 13, the request to access the shared memory 16 in the shared memory portion 13 is compared to the transfer address in the transfer control unit 15 and if the access domain is other than the transfer-not-completed domain and the domain for transfer, read and write operations are performed from/to the domain in the transfer source shared memory 16 in the shared memory portion 13. If the access domain is a transfer end domain, and if the access is a read request, data is read out from the domain of the shared memory 16 of the shared memory portion 13 and the data is transferred to the access request source. If the access is a write access, write is performed into the address of the transfer source domain 17 and the address of the reserved domain 19 in the shared memory portion 13 of the relocation request source.

According to this embodiment, when performing relocation between the shared memory portions, the micro-program of the relocation request source can complete the location by loading transfer information in the transfer control unit 15 and can switch to another processing. After loading the transfer information into the transfer control unit 15, all the shared memories can be accessed without considering that transfer is in progress. For an access to a domain also, the micro-program need not consider address modification or request dispatching. Moreover, by employing the logic that normal processing can have priority to transfer processing, it is possible to reduce the effelct of transfer processing to performance of the other processing. Moreover, by providing the inter-frame connection network for cache access separately from the inter-frame connection network for the shared memories, transfer processing between the shared memory portions can be performed without affecting cache access.

Embodiment 4

Figure 6:
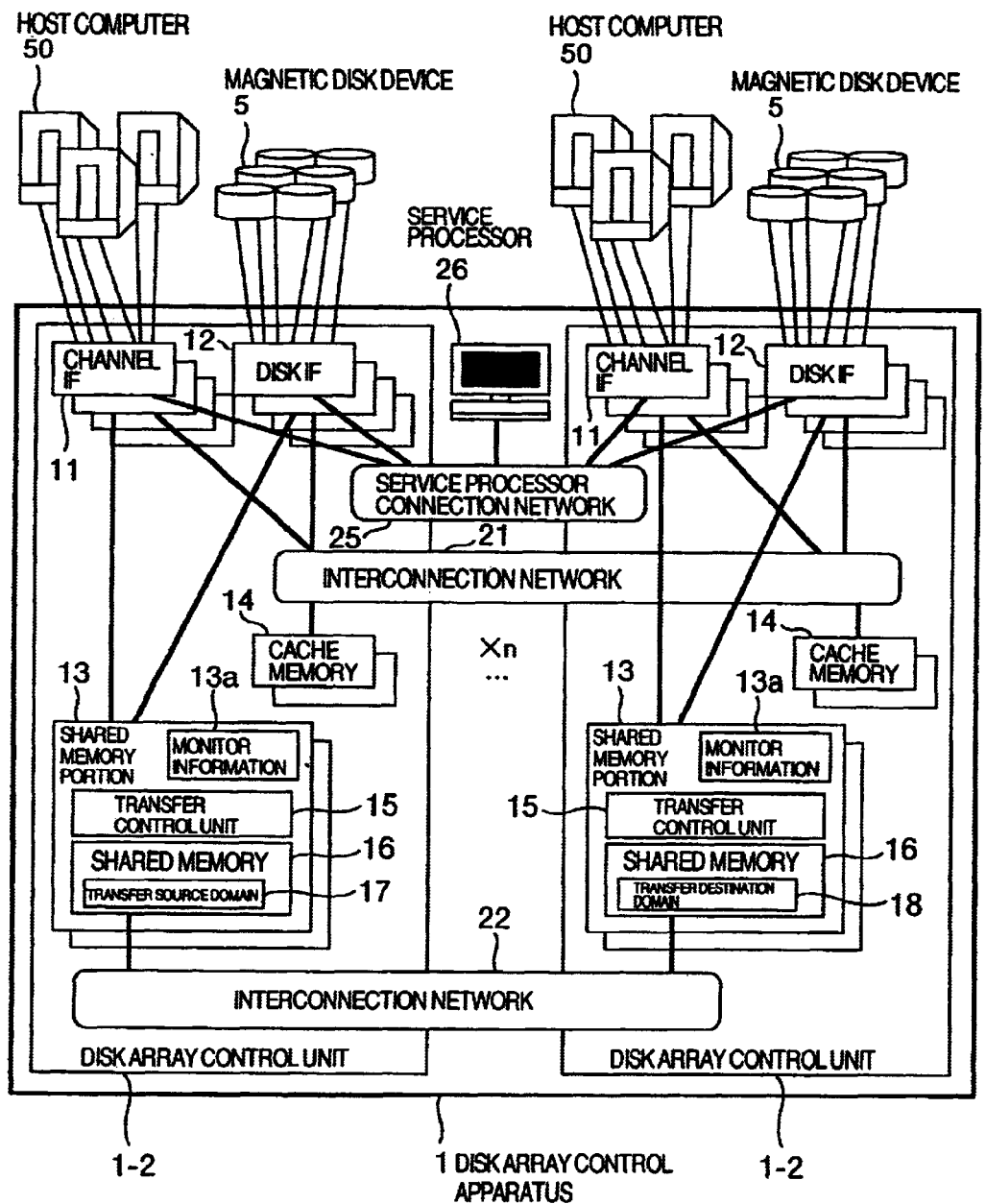
FIG. 6 shows configuration of the disk array control apparatus according to a fourth embodiment of the present invention.

FIG. 6 shows a fourth embodiment of the present invention.

As shown in FIG. 6, the fourth embodiment has configuration identical to that of the first embodiment shown in FIG. 1 except for a service processor connection network 25 connecting a channel interface 11 and a disk interface 12 in one disk array control unit 1–2 with a channel interface 11, a disk interface 12, and a service processor 26 in another disk array control unit 1–2.

The service processor 26 performs unique management of system information including disk information, logic volume information, and error information. By concentrating system information in the service processor 26, it is possible to simplify processing such as addition/removal or moving of a logic volume. Moreover, by connecting a plurality of disk array control units 1–2 by the service processor connection network 25, addition/removal of a disk control unit 1–2 can also be managed by the single service processor 26. The system information such as configuration information is sent via the service processor connection network 25 to the channel interface 11 and the disk interface 12 in each of the disk array control units 1–2. Moreover, the service processor 26 is provided with a monitor function for performing busy management of the disk interface and the like. By this busy management, it is possible to optimize correspondence between the cache memory and the magnetic disk device and between the cache memory and the shared memory. The service processor 26 need not be resident in the system and can function as a service processor by connecting a lap-top personal computer or the like when an error has occurred or addition or removal of a device is required.

Figure 7:
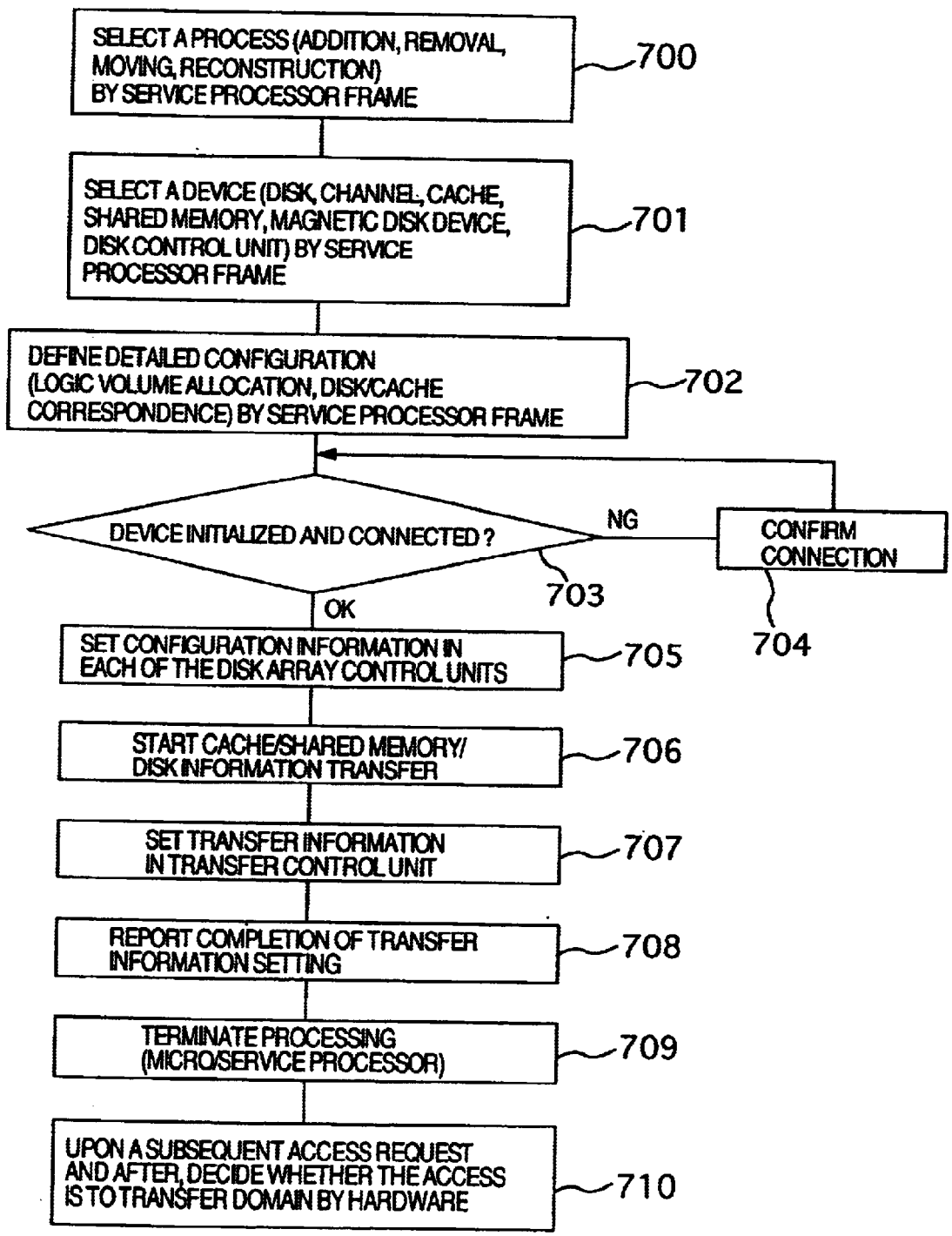
FIG. 7 shows a processing flowchart using a service processor shown in FIG. 6.

Referring to FIG. 7, explanation will be given on a processing flow upon addition, removal, moving, and reconstruction by the service processor 25. Firstly, one of the processes is selected from addition, removal, moving, reconstruction in a service processor frame (Step 700). Next, a device to be processed is selected in a subsequent frame (Step 701). Than, in the service processor frame, a detailed configuration is defined including allocation of a logic volume as an internal management unit, setting a corresponding disk/cache/shared memory, and a number of the devices (Step 702). For clarifying the correspondence, another frame provides a disk/cache/shared memory correspondence and busy information of the cache/interface. After defining the detailed configuration, the specified device is initialized and subjected to a connection check (Step 703). If the check is NG, connection is confirmed and again the device is initialized and subjected to a connection check (Step 704). After the initialization is complete, configuration information is sent from the service processor to the channel interface and the disk interface in each of the disk array control units (Step 705). Subsequently, the service processor activates the processor of the specified device to start transfer processing. Upon reception of the transfer processing activation, a micro-program of the specified device starts transfer processing (Step 706). As for the shared memory, transfer information is set in the transfer control unit (Step 707) and the transfer control unit reports completion of transfer information setting (Step 708), thus completing the transfer processing (Step 709). For a subsequent access and after, the aforementioned function is used to determine whether the access is to the transfer-not-completed domain by hardware during transfer and dispatch the access (Step 710). Thus, software need not recognize transfer processing while proceeding the transfer processing. It is noted that the disk array control apparatus of the present invention is also referred to as a server or a provider. The large storage is not only the plurality of magnetic disk devices, but also includes such as DVD (Digital Video Disk).

According to the present invention, it is possible to provide a disk array system for operating as a single disk array control apparatus a plurality of disk array control apparatuses where a shared memory is dispersed while suppressing performance lowering caused by transfer processing between memories and enabling to provide performance proportional to the number of disk array control apparatuses. Moreover, the present invention enables to realize functions of the disk array control apparatus through a plurality of disk array control apparatuses while suppressing performance lowering.

What is claimed is:

1. A disk array control apparatus comprising a plurality of disk array control units, each having:
   a channel interface interfacing with a host computer;
   a disk interface interfacing with a magnetic disk device;
   a cache memory for temporarily storing data to be read/written from/to the magnetic disk device;
   a shared memory portion for storing control information concerning data transfer between the channel interface and the cache memory and between the disk interface and the cache memory and management information of the magnetic disk device;
   connection means for connecting the channel interface and the disk interface to the cache memory; and
   connection means for connecting the channel interface and the disk interface to the shared memory portion;
   wherein for data read/write request from the host computer, the channel interface performs data transfer between the interface with the host computer and the cache memory while the disk interface performs data transfer between the magnetic disk device and the cache memory, thereby performing data read/write, and
   wherein connection network means is provided for connection between the shared memory portions in the plurality of disk array control units and connection network means is provided for connection between the cache memories in the plurality of disk array control units, thereby enabling transfer processing requiring data transfer between the shared memory portion in one of the disk array control units and the shared memory portion in another disk array control unit.

2. A disk array control apparatus comprising a plurality of disk array control units, each having:
   a channel interface interfacing with a host computer;
   a disk interface interfacing with a magnetic disk device;
   a cache memory for temporarily storing data to be read/written from/to the magnetic disk device;
   a shared memory portion for storing control information concerning data transfer between the channel interface and the cache memory and between the disk interface and the cache memory and management information of the magnetic disk device;
   connection means for connecting the channel interface and the disk interface to the cache memory; and
   connection means for connecting the channel interface and the disk interface to the shared memory portion;
   wherein for data read/write request from the host computer, the channel interface performs data transfer between the interface with the host computer and the cache memory while the disk interface performs data transfer between the magnetic disk device and the cache memory, thereby performing data read/write, and
   wherein connection network means is provided for connection between the shared memory portions in the plurality of disk array control units and connection network means is provided for connection between the cache memories in the plurality of disk array control units, thereby enabling transfer processing requiring data transfer between the shared memory portion in one of the disk array control units and the shared memory portion in another disk array control unit as well as data read/write processing to a transfer processing domain from the channel interface and the disk interface in the disk array control unit even during a transfer processing.

3. The disk array control apparatus as claimed in claim 1, wherein the plurality of channel interfaces and the plurality of disk interfaces are connected to the plurality of cache memories by an interconnection network using a switch capable of being switched to the plurality of disk array control units; and the plurality of channel interfaces and the plurality of disk interfaces are connected to the plurality of shared memory portions by an interconnection network using a switch capable of being switched to the plurality of disk array control units; thereby enabling to perform a transfer processing requiring data transfer between the shared memory portions in one of the disk array control units and the shared memory portion in another disk array control units.

4. The disk array control apparatus as claimed in claim 1, wherein the interconnection network is used for data transfer from the shared memory portion in one of the disk array control units to the shared memory portion in another disk array control unit and recording means is provided for indicating which domain of she shared memory in the shared memory portion has completed transfer.

5. The disk array control apparatus as claimed in claim 1, wherein the interconnection network is used for data transfer from the shared memory portion in one of the disk array control units to the shared memory portion in another disk array control unit and monitor information is provided for monitoring frequency in use of the interconnection network so that data transfer is performed when the frequency in use of the interconnection network is low.

6. The disk array control apparatus as claimed in claim 1, wherein the interconnection network is used for data transfer from the shared memory portion in one of the disk array control units to the shared memory portion in another disk array control unit, when a read request is made, during a data transfer, to the shared memory portion of the transfer destination, it is determined whether the shared memory of the shared memory portion is a transfer end domain and if the shared memory is the transfer end domain, then data is read out from the shared memory of the transfer destination shared memory portion and if the shared memory is a transfer non-end domain, data is read out from the shared memory of the transfer source shared memory portion, and when a write request is made, during data transfer, to the shared memory of the shared memory portion of the transfer destination, data is written into the shared memory of the transfer destination shared memory portion and the corresponding shared memory domain of the transfer source shared memory portion, enabling to asynchronously perform data transfer without affecting other data processing which is transferring data.

7. The disk array control apparatus as claimed in claim 1, wherein the interconnection network is used for data transfer from the shared memory portion in one of the disk array control units to the shared memory portion in another disk array control unit, and during a data transfer, a microprogram of the channel interface or the disk interface can perform read/write processing without considering that the transfer processing is in progress.

8. The disk array control apparatus as claimed in claim 1, wherein the shared memory portion in the disk array control unit has a reserved domain not used for normal operation and the interconnection network is used for transferring data from the shared memory portion in the disk array control unit to the reserved domain of the shared memory portion in another disk array control unit.

9. The disk array control apparatus as claimed in claim 1, wherein connection network means is provided for connecting the disk interface and the channel interfaces in the plurality of disk array control units and the connection network means is connected to a service processor managing configuration information of the disk array control apparatus, so that the service processor can perform addition/removal and moving of a disk, a logic volume, a disk control device, and the like, thereby enabling to control the plurality disk array control units by the single service processor.

10. The disk array control apparatus as claimed in claim 1, wherein the shared memory portion includes transfer control means for setting transfer control information for data transfer; the transfer control means includes: transfer source start address means where a transfer source start address of the shared memory of the data transfer source is loaded, transfer execution bit means where a valid bit indicating a data transfer start is loaded, address generation logic means which is executed when a valid bit is set in the transfer execution bit means, transfer decision logic means, and transfer end decision logic means.

11. The disk array control apparatus as claimed in claim 10, the apparatus further comprising transfer execution address unit where a transfer execution address is set during a data transfer and a counter which is increment each time a data transfer request is made from a data transfer source.

12. A control data transfer method of using a plurality of disk array control means for controlling data transfer between a plurality of host computers and a plurality of magnetic disk devices via channel interface and disk interface when control information concerning data transfer between the host computers and cache memories and management information of the magnetic disk devices are transferred from one of the disk array control means to another of the disk array control means, the method comprising the steps of:

(a) instructing a data transfer request from a microprogram of the channel interface of a data transfer source to the shared memory portion of the disk array control means;

(b) setting a transfer source start address of the shared memory of the data transfer source in transfer source start address means of a data transfer destination;

(c) setting a transfer destination start address of the shared memory of the data transfer destination in the transfer destination start address means;

(d) setting a transfer end address of the shared memory of the data transfer destination in transfer destination end address means;

(e) setting a valid bit indicating a data transfer start in transfer execution bit means of the transfer destination; and (f) performing data transfer by setting the valid bit to execute address generation logic means for data transfer, transfer decision logic means for deciding a state of the data transfer, and transfer end decision logic means.

* * * * *